United States Patent [19]

Delnick

[11] Patent Number: 5,202,203
[45] Date of Patent: Apr. 13, 1993

[54] CHLOROMETHYL CHLOROSULFATE AS A VOLTAGE DELAY INHIBITOR IN LITHIUM CELLS

[75] Inventor: Frank M. Delnick, Albuquerque, N. Mex.

[73] Assignee: The United States of America as represented by the United States Department of Energy, Washington, D.C.

[21] Appl. No.: 680,973

[22] Filed: Apr. 5, 1991

[51] Int. Cl.[5] .......................... H01M 6/14; H01M 6/16
[52] U.S. Cl. ..................................... 429/196; 429/197; 429/198
[58] Field of Search ........................ 428/196, 198, 197

[56] References Cited

U.S. PATENT DOCUMENTS

| | | | |
|---|---|---|---|
| 4,309,490 | 1/1982 | Chua et al. | 429/101 |
| 4,360,572 | 11/1982 | Chua et al. | 429/53 |
| 4,547,441 | 10/1985 | Vallin et al. | 429/196 |
| 4,649,209 | 3/1987 | Geering | 558/46 |

OTHER PUBLICATIONS

A. Baldwin et al., "Active Primary Lithium Thionyl Chloride Battery For Artillery Applications", *Proceedings of the 34th Power Sources Symposium*, 1990.

F. Delnick et al., "Voltage Delay In Li/Socl2 Cells For Artillery Applications at −35° C.", *34th International Power Sources Symposium*, Cherry Hills, N.J., Jun. 25–28, 1990.

F. Delnick et al., "AC Impedance Study of Porous Carbon Collectors For Li/SO2 Primary Cells", *Chemical Engineering Communication*, vol. 35, 1985, pp. 23–28.

F. Delnick "Impedance of Passive Lithium Anodes in SOCl2 Solutions Under Low-Field Polarization", *Proceedings of the Symposium on Primary and Secondary Ambient Temperature Lithium Batteries*, 1988, pp. 212–228.

*Primary Examiner*—Anthony McFarlane
*Assistant Examiner*—Nhat Phan
*Attorney, Agent, or Firm*—Armand McMillan; James H. Chafin; William R. Moser

[57] ABSTRACT

Chloromethyl chlorosulfate (CMCS) is used as a passive film growth inhibitor in electrochemical cells to minimize voltage delay and low-voltage discharge. Film growth on lithium anodes is significantly diminished when CMCS is added to $SOCl_2$ and $SO_2Cl_2$ electrolytes of lithium batteries. The CMCS also has the effect of extending the shelf-life of $Li/SOCl_2$ and $Li/SO_2Cl_2$ batteries.

17 Claims, 6 Drawing Sheets

CHLOROMETHYL CHLOROSULFATE AS A VOLTAGE DELAY INHIBITOR IN LITHIUM CELLS

The Government has rights in this invention pursuant to Contract No. DE-AC04-76DP00789 awarded by the U.S. Department of Energy to the American Telephone & Telegraph Company.

BACKGROUND OF THE INVENTION

The present invention relates to lithium oxyhalide cells and, more particularly, to voltage delay inhibitors which inhibit the growth of LiCl passive film on an electrode surface.

Two active prismatic Li/SOCl$_2$ batteries are typically used in the development of Artillery Fired Atomic Projectiles (AFAP). One battery powers the telemetry system (TM battery) and the other powers a Projectile Event Timer circuit (PET battery). Both batteries must operate over a temperature range of $-35°$ C. to $+55°$ C. throughout the dynamic environment of the artillery gun barrel.

In artillery applications, a typical discharge lasts less than 180 seconds, and requires less than 10% of the energy capacity of each cell. The primary mode of electrochemical failure is voltage delay caused by the open-circuit growth of a passive film on the lithium anode during ambient storage, transportation and system assembly. In active Li/SOCl$_2$ batteries, the Li anode reacts directly with the SOCl$_2$ (thionyl chloride) electrolyte to form a LiCl passive film on the anode surface. This film is necessary to separate the anode and cathode of the cell. However, the film continues to grow thicker during the shelf-life storage of the battery. If the film becomes too thick, it may inhibit the kinetic performance of the anode once the battery is ultimately discharged. This results in a voltage delay and/or sustained low-voltage discharge.

Various approaches to eliminating this mode of failure include the use of: 1) electrolyte additives to minimize anode passivation, 2) a high-rate predischarge (at the time of manufacture) to initiate reproducible passive film growth, and 3) a specified controlled low-temperature shelf-life storage environment. Several substances have been added to Li/SOCl$_2$ cells to mitigate voltage delay, including: LiAl; cyanoacrylate; epoxy (special formulation); SiF$_4$; polyvinyl chloride; Li$_2$B$_{10}$Cl$_{10}$, Li$_2$B$_{12}$Cl$_{12}$; NbCl$_5$+Li$_2$S/Li$_2$O; LiGaCl$_4$; So$_2$ (with cobalt tetracarboxylated phenyl porphyrin); SiO$_2$, TeO$_2$ (with LiNbCl$_6$); LiSO$_3$X (X being F$^-$, Cl$^-$, or Br$^-$), SO$_3$; and LiAl(SO$_3$Cl)$_4$ (TCSAL).

The precise mechanisms by which these additives inhibit LiCl film growth is not known. The kinetics of LiCl film growth in Li/SOCl$_2$ cells can be monitored in situ by measuring the frequency dispersion of the complex impedance of the active cell. Appropriate mathematical analysis of the high frequency region of the impedance spectrum yields the ionic resistance and dielectric capacitance of the LiCl passive film. These parameters are related to film thickness. However, both parameters (resistance and capacitance) are also affected by structural defects such as grain boundaries and porosity of the passive film, the composition and concentration of the electrolyte, and the temperature of the cell. The resistance of the passive film controls the voltage delay in the cell discharge, and cells with low passive film resistances exhibit minor delays and high discharge voltage. Cells with high passive film resistance exhibit longer delays and lower voltage discharges. Passive film resistance is non-ohmic.

U.S. Pat. No. 4,547,441 discloses an electrochemical cell comprising a negative active material, and an electrolyte comprising a solute, a liquid oxyhalide solvent, and a mineral substance which reduces a voltage rise delay in the cell. The negative active material may be lithium. The mineral substance may be added to the electrolyte or may be reacted with a substance from the group comprising HSO$_3$X, SO$_3$, H$_2$SO$_4$ and mixtures thereof, wherein X may be chlorine, fluorine, bromine or iodine. The mineral substances may be LiAl(SO$_3$Cl)$_4$. LiAl(SO$_3$Cl)$_4$ (tetra-chlorosulfato-aluminate, lithium salt, or TCSAL) is disclosed as a voltage delay inhibitor in Li/SOCl$_2$ cells. TCSAL is formed by the reaction of chlorosulfonic acid with SOCl$_2$ and LiAlCl$_4$. LiAlCl$_4$ is a supporting electrolyte which is used in Li/SOCl$_2$ cells. It is believed that the following reaction takes place:

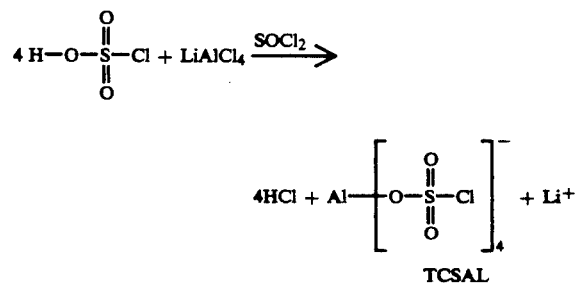

TCSAL

The HCl is removed by reflux prior to filling cells.

U.S. Pat. No. 4,309,490 discloses an electrochemical cell comprising a lithium anode, thionyl chloride, lithium tetrachloroaluminate electrolyte and sulfur dioxide to prevent growth of a lithium chloride crystal film on the lithium anode. A sufficient quantity of sulfur dioxide is employed in the cell to regulate the growth of the crystals on the lithium anode. The SO$_2$ complexes with LiAlCl$_4$ to form the complex LiAlCl$_4$*xSO$_2$. Typically, the 1:1 complex (x=1) is used in Li/SOCl$_2$ cells (e.g. LiAlCl$_4$*SO$_2$).

U.S. Pat. No. 4,649,209 discloses a process of preparing methyl chlorosulfates, comprising the steps of: 1) reacting methylene chloride and sulfur trioxide; 2) adding a stabilizing agent such as sodium carbonate or sodium bicarbonate to allow distillation without decomposition of the reaction mixture; 3) distilling the stabilized reaction mixture by a two-stage fractional distillation procedure; and 4) recovering the methyl chlorosulfates. In the first stage, chloromethyl chlorosulfate is the primary product and in the second stage methylene bis(chlorosulfate) is the primary product. Methylene bis(chlorosulfate) is disclosed as an electrolyte for lithium batteries.

SUMMARY OF THE INVENTION

The present invention relates to the use of chloromethyl chlorosulfate (CMCS) as a passive film growth inhibitor in Li/SOCl$_2$ and Li/SO$_2$Cl$_2$ batteries. The invention minimizes voltage delay and low-voltage discharge. When CMCS is added to the electrolyte of such batteries, passive film growth on the lithium anode is significantly diminished. Consequently, voltage delay is significantly reduced and high voltage discharges are obtained. The CMCS has the effect of extending the shelf-life of such batteries. The quantitative extent of this improvement depends upon the discharge rate required by the application. In general, CMCS offers greater improvements in shelf-life for cells which are to be used in high-rate applications.

BRIEF DESCRIPTION OF THE DRAWINGS

The invention may be more fully understood by reference to the accompanying drawings and the following description of the embodiments shown in those drawings. The invention is not limited to these illustrative embodiments but should be recognized as contemplating all modifications within the skill of an ordinary artisan.

DETAILED DESCRIPTION OF PREFERRED EMBODIMENTS

Figure 1:
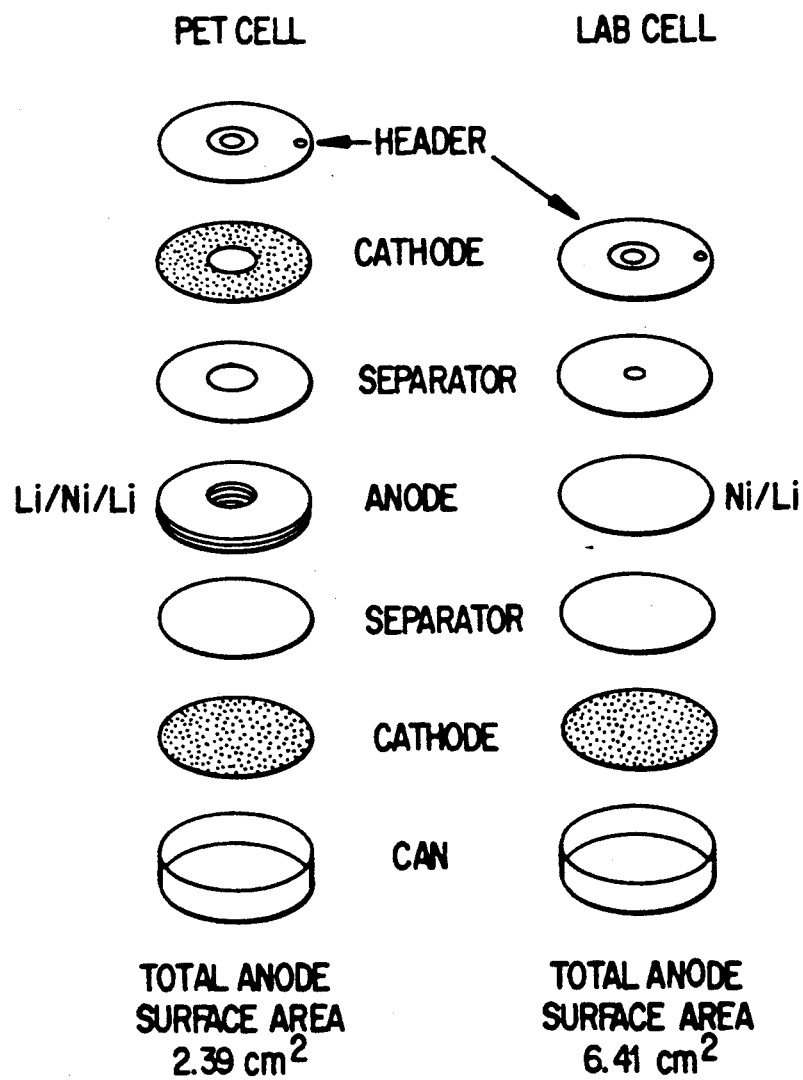
FIG. 1 shows the internal components for a projectile event timer (PET) battery and a laboratory (LAB) test cell.
Figure 2A:
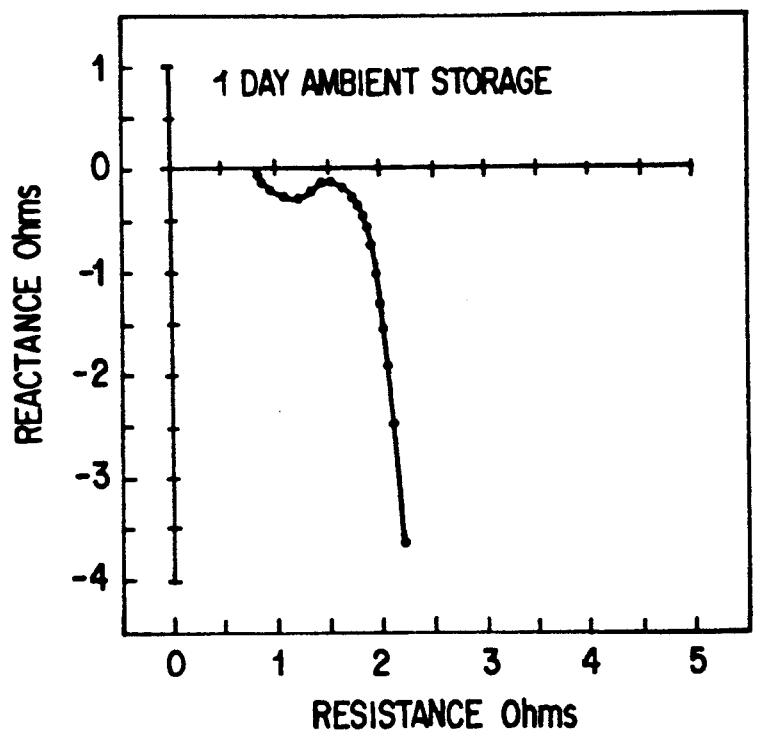
FIGS. 2a to 2d show the complex impedance of a laboratory test cell measured during ambient temperature storage.
Figure 2B:
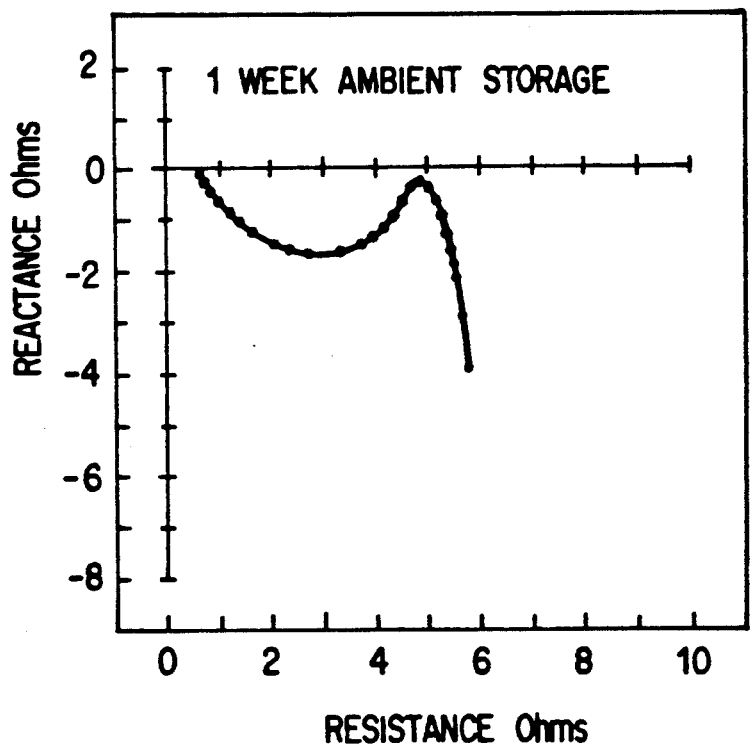
Figure 2C:
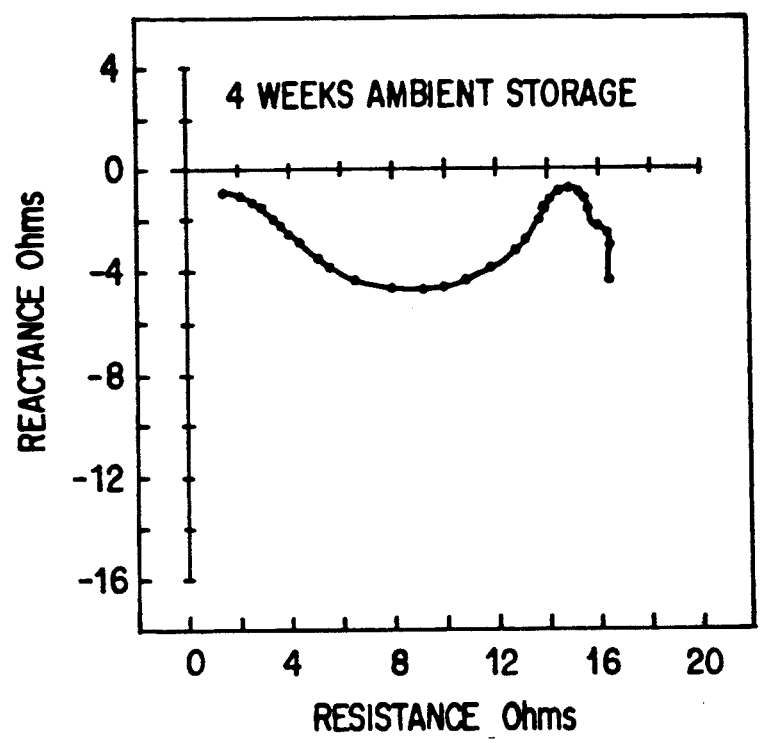
Figure 2D:
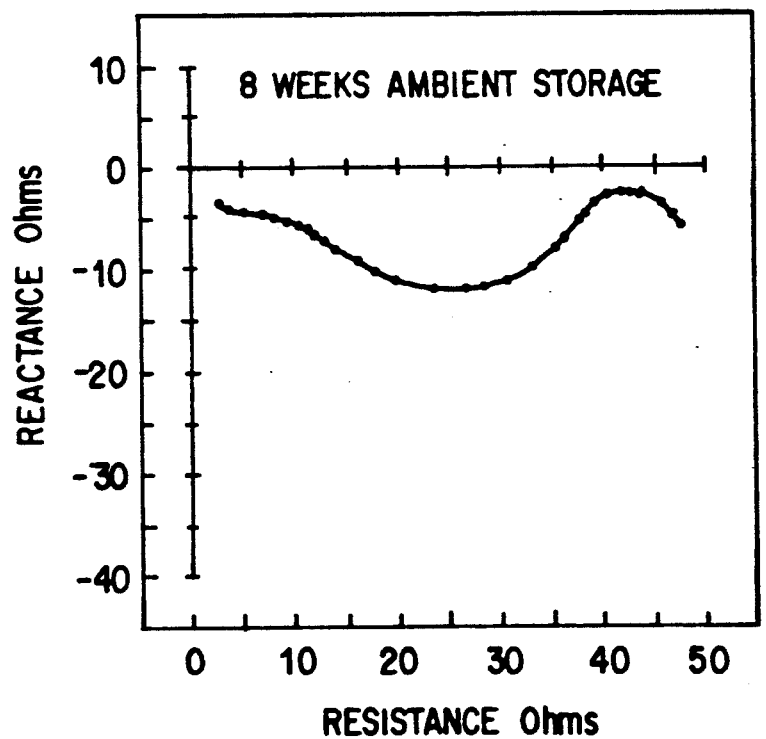

The present invention provides an LiCl film growth inhibiting electrolyte for an electromechanical cell, which comprises chloromethyl chlorosulfate (CMCS). CMCS is particularly useful in Li/SOCl$_2$ and Li/SO$_2$Cl$_2$ batteries. According to the present invention, electrolytes for electrochemical cells, comprising CMCS, inhibit LiCl film growth and provide batteries which generate a high-voltage discharge. The present invention is extremely important in batteries used in artillery-fired atomic projectiles which must operate over a temperature range of −35° C. to +55° C. throughout the dynamic environment of an artillery gun barrel.

Typical cells for which the CMCS-containing electrolyte of the present invention is useful generally comprise an anode, a cathode, a separator, and an electrolyte. The most preferred electrochemical cells of the present invention comprise a catholyte which functions as both the cathode and the electrolyte. The cells of the present invention preferably comprise a lithium anode.

Electrolytes according to the present invention comprise an electrolytic solution of thionyl chloride (SOCl$_2$) or sulfuryl chloride (SO$_2$Cl$_2$). Thionyl chloride is most preferred.

Electrolyte solutions according to the present invention also comprise an ion donating compound. The most preferred ion donating compound is lithium tetrachloroaluminate (LiAlCl$_4$). The concentration of the LiAlCl$_4$ is preferably between about 0.5M and about 1.8M, about 1.0M to about 1.5M being most preferred.

According to the present invention, electrolytes for electrochemical cells which comprise CMCS inhibit LiCl film growth in such cells. As a result, electrochemical cells are provided which can generate a high voltage discharge. CMCS may be used either alone or in combination with other film growth inhibitors in electrolytes of electrochemical cells.

When CMCS is added to SOCl$_2$ electrolyte containing LiAlCl$_4$*SO$_2$, proton NMR analysis suggests that the following reaction takes place:

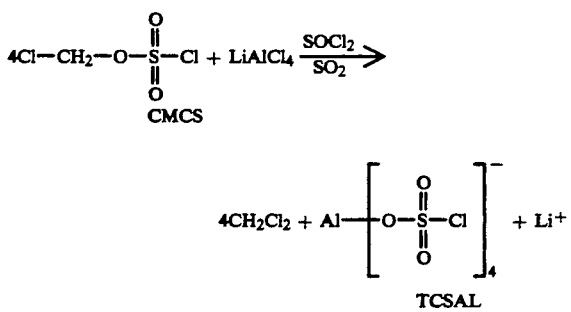

The CH$_2$Cl$_2$ accelerates film growth when added to LiAlCl$_4$*SO$_2$—SOCl$_2$ alone. When CH$_2$Cl$_2$ is added in excess to a solution of CMCS plus LiAlCl$_4$*SO$_2$—SOCl$_2$, film growth is not accelerated. It is possible that CH$_2$Cl$_2$ simply acts as a cosolvent to enhance the performance of TCSAL. It is also possible that some other reaction (not detected by proton NMR) is occurring.

The best way to evaluate voltage delay inhibitors is to compare the effects of the inhibitor on the growth of the passive film resistance. When compared to other growth inhibitors, such as TCSAL, and compounds similar to CMCS, chloromethyl chlorosulfate shows surprising results in inhibiting LiCl film growth. The concentration of CMCS in electrolytes according to the present invention may vary but is preferably between about 0.1M and about 1.0M. Concentrations of between about 0.1M and about 0.1M are preferred.

When sulfur dioxide (SO$_2$) is also used in the electrolytes of the present invention, its concentration may vary. SO$_2$ concentrations of between about 0.5M and about 1.8M are preferred, and a concentration of SO$_2$ equal to the concentration of LiAlCl$_4$ is still more preferred. Mixtures with other additives and film growth inhibitors in electrolytes according to the present invention are also possible.

Electrochemical cells according to the present invention may also contain a cathodic current collector, usually made of carbon or nickel. These current collectors provide an active surface on which reductions in an electrochemical cell take place. The current collector is necessarily in contact with the electrolyte or catholyte, and preferably has a porous structure to provide a large surface area on which chemical reductions can take place. The current collector may be attached to the can which forms the exterior housing of the entire cell, or it may be attached to the center pin of the header. In the former case, the can assumes a positive polarity, while in the latter case it assumes a negative polarity.

A separator may also be provided between the anode and cathode or catholyte in electrochemical cells according to the present invention. The separator is preferably soaked in the electrolyte or catholyte and most preferably comprises a porous structure.

Electrochemical cells according to the present invention are prepared by standard cell preparation methods, with the exception that CMCS is added to the electrolyte or catholyte prior to introduction into the can.

EXAMPLES

The electrochemical designs of a PET cell and LAB test cell are shown in FIG. 1. Each cell contains a can, a header, a separator, an anode, another separator, and a cathode. A 1.0M LiAlCl$_4$—SOCl$_2$ control electrolyte was used to fill the cell. The electrolyte was from Lithco (Lithium Corporation of America, 449 North Cox Road, Gastonia N.C. 28054). Before use, this electrolyte was refluxed with lithium metal for four hours. The 1.0M LiAlCl$_4$*SO$_2$—SOCl$_2$ electrolyte was prepared by adding SO$_2$ gas to the control electrolyte. The CMCS was vacuum distilled at 55° C. and 10 mbar before addition to SOCl$_2$ electrolytes. Purity and composition of the CMCS were verified by NMR.

After the cells were filled with electrolyte, they were cooled to $-35°$ C. and predischarged at 200 $\Omega$-cm$^2$ for 120 seconds to establish reproducible film growth kinetics. These cells remained at $-35°$ C. for 24 hours after predischarge. After this 24-hour period, the cells were warmed to room temperature and the complex impedance of each cell was monitored at open circuit as a function of time. All discharges were conducted at $-35°$ C.

The separator was a model DBS 30 unwoven binderless glass paper from Whatman International Company (6 Just Road, Fairfield, N.J. 07004). The cathode comprised Shawinigan acetylene black obtained from Chevron Chemicals Company (Box 3766, Houston, Tex.) and 8% by weight of poly(tetrafluoroethylene) Teflon® binder. The header and can were made of stainless steel. The LAB cell diameter was 3.3 cm and the PET cell diameter was 1.6 cm.

The ambient temperature, open-circuit growth in the complex impedance of a prismatic Li/SOCl$_2$ LAB cell is shown in FIGS. 2a, 2b, 2c, and 2d. This cell contains 1M LiAlCl$_4$*SO$_2$. One day after the cell is brought to room temperature (two days after filling), the complex impedance exhibits ideal characteristics (see FIG. 2a). The high frequency semicircular arc describes the dielectric response of the passive film on the lithium anode. This portion of the impedance spectrum can be represented by a single parallel RC circuit in which R, the diameter of the semicircle, represents the primary resistance of the passive film, and C represents the dielectric capacitance of the film. The primary resistance controls the low-field polarization and the initial portion of the high-field polarization of the anode during discharge. The low-frequency tail in the impedance spectrum represents double-layer charging within the pore structure of the cathode. The frequency range was from 60 kHz to 0.1 Hz.

As the passive film grows, the anode impedance dominates and, at eight weeks (FIG. 2d), is composed of at least two incompletely resolved parallel RC circuits connected to one another in series. An ill-defined, low-frequency region further complicates this spectrum. It is not yet possible to associate all components of the complex impedance spectrum with precise physical or electrochemical processes within the passive film. Therefore, it is not possible to predict discharge behavior or compute film thickness directly from such intricate impedance spectra. Nevertheless, one can correlate discharge characteristics and film growth with some components of the impedance spectrum. This correlation is very good when the impedance components are few and well defined as in FIG. 2a. However, the correlation can degenerate as the number of impedance components increases and the resolution of each component decreases as in FIG. 2d.

Figure 3:
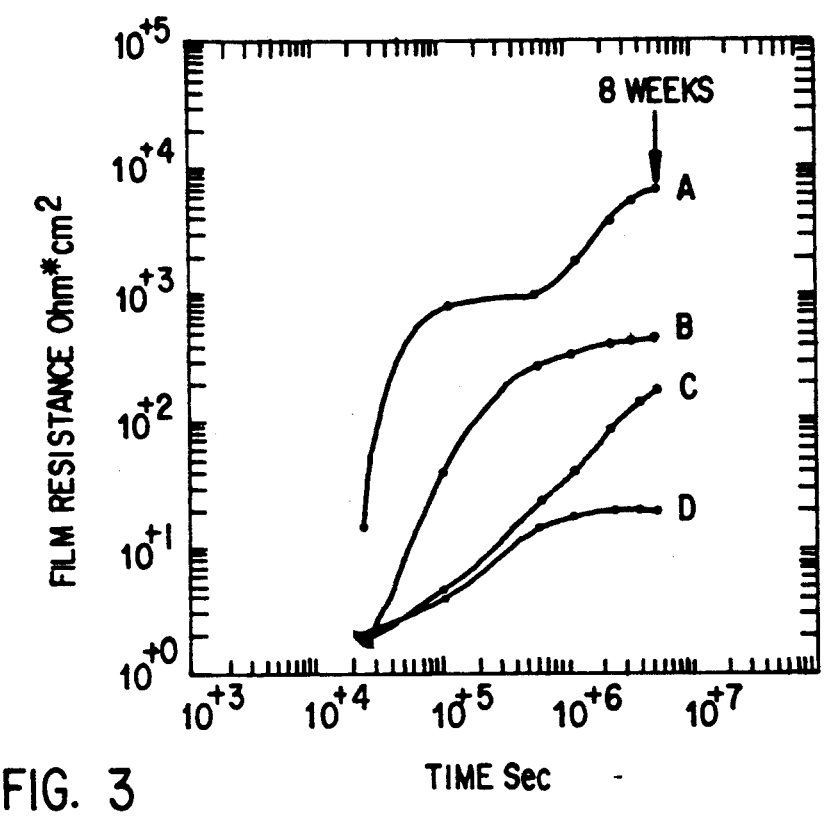
FIG. 3 shows the growth in primary resistances of passive films on lithium anodes in four laboratory test cells at ambient temperature.

FIG. 3 shows the growth in the primary resistance of the passive films in Li/SOCl$_2$ cells having four different electrolyte additive compositions. Cell A contains the control electrolyte, 1.0M LiAlCl$_4$, with no additives. Cell B contains the control electrolyte with 0.1M CMCS. Cell C contains the supporting electrolyte, 1.0M LiAlCl$_4$*SO$_2$. Cell D contains the same electrolyte as Cell C, with the addition of 0.1M CMCS. After eight weeks of ambient storage, Cell D exhibits a primary passive film resistance three orders of magnitude lower than Cell A containing the control electrolyte. The complex impedance spectra for Cell D are shown in FIG. 4.

Figure 4:
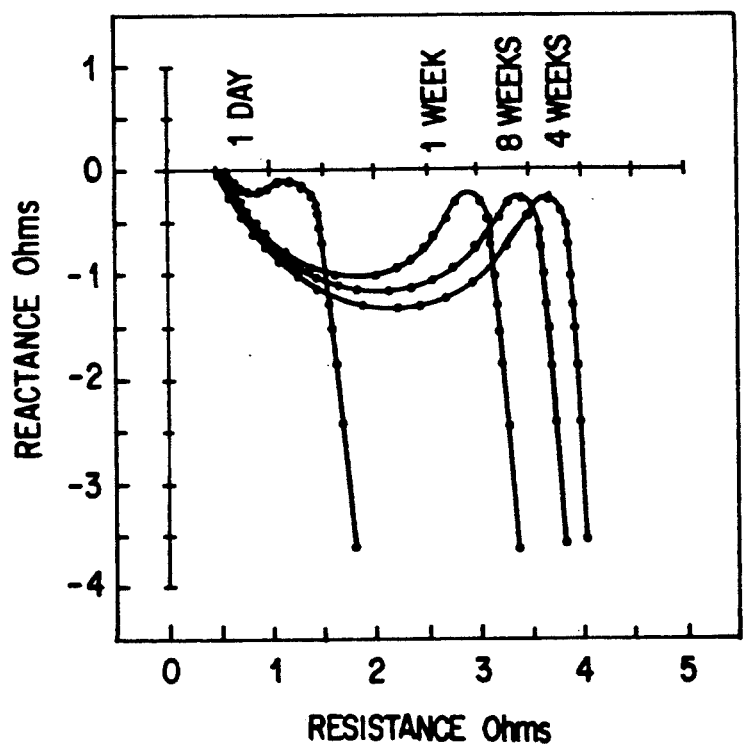
FIG. 4 shows the complex impedance of cell D of FIG. 3.

In addition to inhibiting the growth in the primary resistance of the passive film, the CMCS has also inhibited the development of the other unresolved and ill-defined impedances (compare FIGS. 2 and 4). After eight weeks, the cathode impedance is easily resolved and unchanged by the CMCS.

Figure 5:
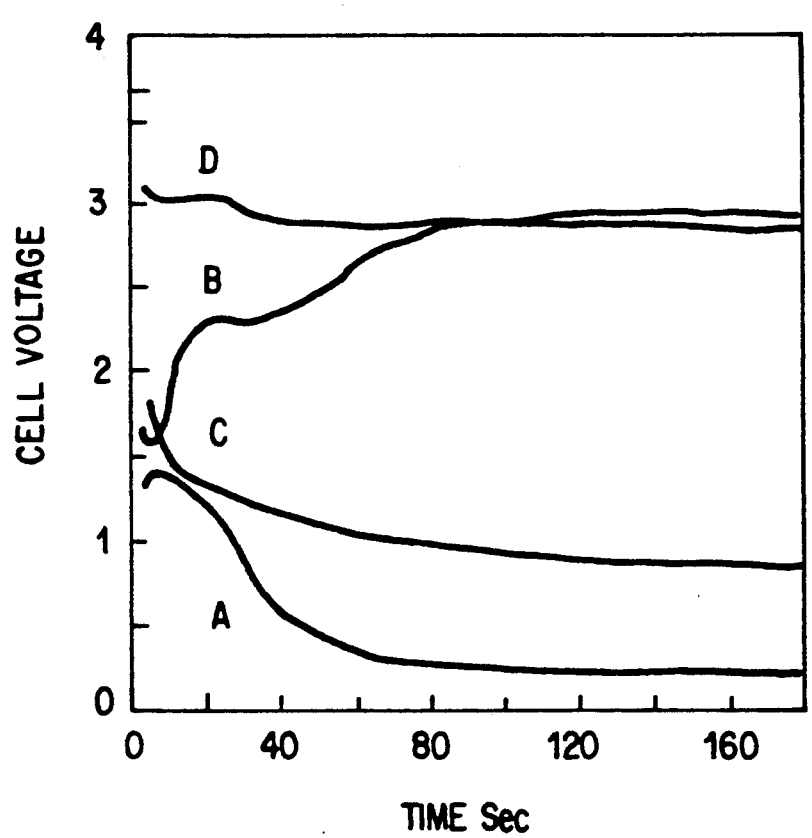
FIG. 5 shows discharges from the cells of FIG. 3.

FIG. 5 shows the discharge profiles for cells A, B, C, and D after eight weeks of ambient storage. These discharges were conducted at 3000 ohm.cm$^2$ load and at $-35°$ C. Cell D with 1.0M LiAlCl$_4$*SO$_2$+0.1M CMCS discharged at a higher voltage than all other cells. As indicated in FIG. 3, the discharge of Cell D is least influenced by anode passivation.

Figure 6:
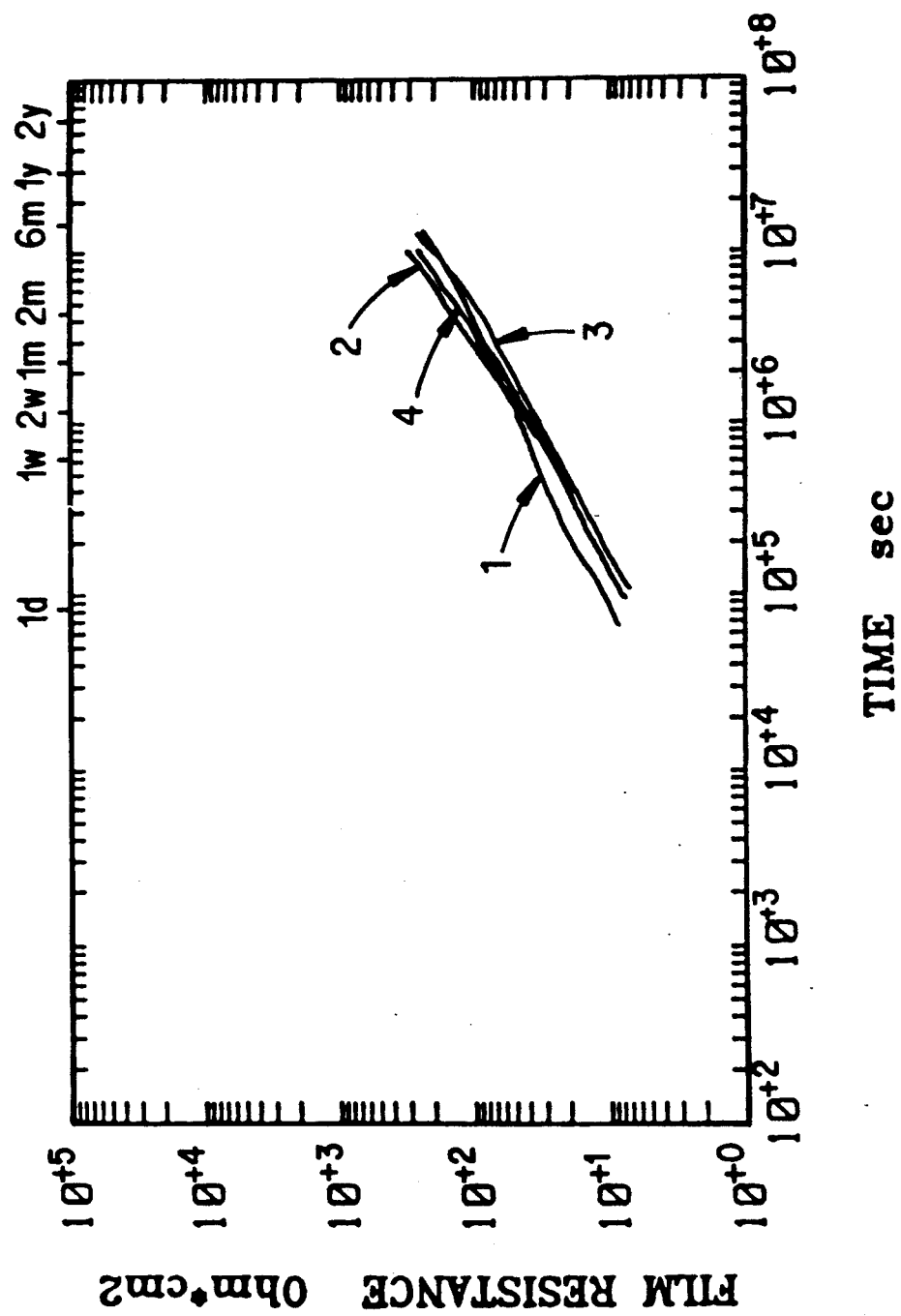
FIG. 6 shows the growth in passive film resistance for Li/SOCl$_2$ cells which contain: 1) LiAlCl$_4$, 2) LiAlCl$_4$*SO$_2$, and 3) LiAlCl$_4$*SO$_2$+0.3M CMCS.

FIG. 6 shows a comparison of the effect of compounds similar in chemical structure to CMCS on film resistance over time in typical LAB cells in which these compounds were added to the electrolyte. Curve 1 represents a cell containing a control electrolyte comprising 1.5M LiAlCl$_4$*SO$_2$. Curve 2 represents a cell containing an electrolyte which comprises 0.3M methylsulfonyl chloride (MSC). Curve 3 represents a cell containing an electrolyte which comprises 0.25M chloromethylsulfonyl chloride (CMSC). Curve 4 represents a cell containing 0.3M chloroethylsulfonyl chloride (CESC). The cells represented by curves 2 to 4 show no surprising results in resistance over time when compared to the control cell shown in curve 1. In contrast, chloromethyl chlorosulfate shows unexpected results in controlling resistance over time in standard LAB cells, as illustrated for example in Cell D of FIG. 3.

All tests were conducted in Li/SOCl$_2$ cells. However, because of similar passivation characteristics in Li/SO$_2$Cl$_2$ cells, CMCS could be used in Li/SO$_2$Cl$_2$ cells to yield similar improvements. The concentration of SO$_2$ in the electrolytes which were tested was 1.0M.

CMCS is reduced at 3.68–3.69 volts with respect to Li oxidation. Therefore, it is possible that CMCS can be used as a cathode (instead of SOCl$_2$) in a lithium battery with a suitable supporting electrolyte.

Although the invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A lithium electrochemical cell having an electrolyte mixture comprising chloromethyl chlorosulfate.

2. The cell of claim 1, wherein the electrolyte comprises a compound selected from the class consisting of thionyl chloride, sulfuryl chloride, and mixtures thereof.

3. The cell of claim 2, wherein the electrolyte further comprises lithium tetrachloroaluminate in a concentration within the range of about 0.5 to 1.8M.

4. The cell of claim 1, wherein the electrolyte further comprises sulfur dioxide.

5. The cell of claim 4, where the sulfur dioxide is present in a concentration of about 0.5 to 1.8M.

6. The cell of claim 1, wherein the chloromethyl chlorosulfate in the electrolyte mixture is present in a concentration of about 0.01 to about 1.0M.

7. The cell of claim 3, wherein the chloromethyl chlorosulfate is present in a concentration of about 0.01 to 0.1M.

8. The electrochemical cell of claim 2, wherein the electrolyte comprises about 1.0 to about 1.5M lithium tetrachloroaluminate, about 0.01 to 0.1M chloromethyl chlorosulfate, and sulfur dioxide in a concentration equal to that of the tetrachloroaluminate.

9. A method of inhibiting passive film growth in a lithium electrochemical cell, comprising mixing chloromethyl chlorosulfate with the cell electrolyte.

10. A method as in claim 9, wherein said electrolyte mixture comprises a compound selected from the class consisting of thionyl chloride, sulfuryl chloride, and mixtures thereof.

11. A method as in claim 10, wherein said electrolyte mixture further comprises lithium tetrachloroaluminate.

12. A method as in claim 9, wherein said electrolyte mixture further comprises sulfur dioxide.

13. A method as in claim 9, wherein said electrolyte mixture comprises about 0.01 about to 1.0M chloromethyl chlorosulfate, about 0.5 to about 1.8M lithium chloroaluminate, and about 0.5 to about 1.8M sulfur dioxide.

14. A method as in claim 10, wherein said electrolyte mixture comprises about 0.01 to about 0.1M chloromethyl chlorosulfate, about 1.0 to about 1.5M lithium tetrachloroaluminate, and sulfur dioxide in a concentration equal to that of the lithium tetrachloroaluminate.

15. An electrolyte mixture for lithium electrochemical cell, comprising a film growth regulating quantity of chloromethyl chlorosulfate.

16. An electrolyte mixture as in claim 15, comprising about 0.01 to about 1.0M chloromethyl chlorosulfate, about 0.5 to about 1.8M lithium tetrachloroaluminate, and about 0.5 to about 1.8M sulfur dioxide.

17. An electrolyte mixture as in claim 15, comprising about 0.01 to about 0.1M chloromethyl chlorosulfate, about 1.0 to about 1.5M lithium chloroaluminate, and sulfur dioxide in a concentration equal to that of the lithium tetrachloroaluminate.

* * * * *